US012572045B2

(12) United States Patent
Yong et al.

(10) Patent No.: US 12,572,045 B2
(45) Date of Patent: Mar. 10, 2026

(54) LIQUID CRYSTAL DISPLAY PANEL AND LIQUID CRYSTAL DISPLAY DEVICE

(71) Applicants: Huizhou China Star Optoelectronics Display Co., Ltd., Huizhou (CN); TCL China Star Optoelectronics Technology Co., Ltd., Shenzhen (CN)

(72) Inventors: Weina Yong, Huizhou (CN); Peng Du, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 370 days.

(21) Appl. No.: 18/038,999

(22) PCT Filed: Mar. 31, 2023

(86) PCT No.: PCT/CN2023/085748
§ 371 (c)(1),
(2) Date: May 26, 2023

(87) PCT Pub. No.: WO2024/197920
PCT Pub. Date: Oct. 3, 2024

(65) Prior Publication Data
US 2025/0314933 A1     Oct. 9, 2025

(30) Foreign Application Priority Data
Mar. 29, 2023     (CN) .......................... 202310326914.6

(51) Int. Cl.
*G02F 1/1368*     (2006.01)
*G02F 1/1335*     (2006.01)
*G02F 1/1362*     (2006.01)

(52) U.S. Cl.
CPC ...... *G02F 1/1368* (2013.01); *G02F 1/133514* (2013.01); *G02F 1/136213* (2013.01)

(58) Field of Classification Search
CPC ............. G02F 1/1368; G02F 1/133514; G02F 1/136213
See application file for complete search history.

(56) References Cited

U.S. PATENT DOCUMENTS 6,411,346 B1     6/2002  Numano et al.
2018/0231829 A1*  8/2018  Itou ....................... G02F 1/1343

FOREIGN PATENT DOCUMENTS

CN          106773239        5/2017
CN          108227293        6/2018
(Continued)

OTHER PUBLICATIONS

International Search Report and the Written Opinion Dated Dec. 5, 2023 From the International Searching Authority Re. Application No. PCT/CN2023/085023 and Its Translation Into English. (15 Pages).

*Primary Examiner* — Lucy P Chien

(57) ABSTRACT

The present application provides a liquid crystal display panel and a liquid crystal display device. The liquid crystal display panel makes the second capacitor of the first sub-pixel greater than the second capacitor of the second sub-pixel and connects a drain electrode to a pixel electrode such that a ratio of the first capacitor of the first sub-pixel in a capacitor formed by and connected to the pixel electrode is similar to or even the same as a ratio of the first capacitor of the second sub-pixel in the capacitor formed by and connected to the pixel electrode, which avoids issues of display crosstalk and afterimage.

20 Claims, 4 Drawing Sheets

(56)          References Cited

FOREIGN PATENT DOCUMENTS

| CN | 108681167 | 10/2018 |
|----|-----------|---------|
| CN | 112394566 | 2/2021 |
| CN | 114647109 | 6/2022 |
| JP | 2003-091017 | 3/2003 |
| JP | 1979311 | 6/2007 |
| KR | 10-2007-0022992 | 2/2007 |
| KR | 10-2008-0076476 | 8/2008 |
| WO | WO 2011/155143 | 12/2011 |

* cited by examiner

LIQUID CRYSTAL DISPLAY PANEL AND LIQUID CRYSTAL DISPLAY DEVICE

RELATED APPLICATIONS

This application is a National Phase of PCT Patent Application No. PCT/CN2023/085748 having International filing date of Mar. 31, 2023, which claims the benefit of priority of Chinese Patent Application No. 202310326914.6 filed on Mar. 29, 2023. The contents of the above applications are all incorporated by reference as if fully set forth herein in their entirety.

FIELD OF INVENTION

The present application relates to a field of display technologies, especially to a liquid crystal display panel and a liquid crystal display device.

BACKGROUND OF INVENTION

Thin film transistor-liquid crystal displays (TFT-LCDs) are widely used due to its advantages such as long lifespan, mature technology, and low cost. In a conventional liquid crystal display device, the transmittance of light of different wavelengths is different. For example, short wavelength blue light reaches the point of transmittance inversion faster than red light and green light due to differences in refractive index and cell gap (a distance between the pixel electrode and the common electrode), which leads to a color deviation in mixed light and breaks the white balance between red, blue, and green light. To solve this issue, conventional liquid crystal display devices make the cell gap of blue pixel less than that of red and green pixels, which leads to display crosstalk and afterimage. Additionally, to reduce the number of chips on the film, conventional liquid crystal display devices use Trigate technology (which has three times the number of scan lines as a normal display panel). In Trigate display panels, a thickness of the blue color resist is greater than that of the red and green color resists, which leads to the cell gap of the blue pixel being less than that of the red and green pixels. This results in the lateral capacitor formed between the pixel electrode and the gate electrode of the blue pixel occupying a different proportion of the total capacitor formed or connected by the pixel electrode than that of the red and green pixels. This causes differences in the optimal common voltage between the red and the blue pixels and between the green and the blue pixels, further increasing the issues of display crosstalk and afterimage.

Therefore, conventional liquid crystal display panels have an issue of display crosstalk and afterimage caused by the different proportions of capacitors between the pixel electrode and the gate electrode of different emitting color pixels compared to the total capacitor formed or connected by the pixel electrode.

SUMMARY OF INVENTION

Technical issue

An embodiment of the present application provides a liquid crystal display panel and a liquid crystal display device to ease an issue of a conventional liquid crystal display panel has a different ratio of a capacitor to a total capacitor in formation or connection of a pixel electrode of a pixel electrode and a gate electrode of a pixel in a different light emitting color to further lead to display crosstalk and afterimage.

Technical solution

To solve the above issue, technical solutions provided by the present application are as follows:

An embodiment of the present application provides a liquid crystal display panel, and the liquid crystal display panel comprises:

a base substrate;

a first metal layer disposed on a side of the base substrate, wherein the first metal layer comprises a gate electrode;

a second metal layer disposed on a side of the first metal layer, wherein the second metal layer comprises a drain electrode; and a pixel electrode layer disposed on a side of the second metal layer away from the base substrate, wherein the pixel electrode layer comprises a pixel electrode, and the pixel electrode is electrically connected to the drain electrode;

wherein the pixel electrode and the gate electrode form a first capacitor, the drain electrode and the gate electrode form a second capacitor, the liquid crystal display panel comprises a plurality of pixel units disposed in an array, each of the pixel units comprises a first sub-pixel and a second sub-pixel displaying different colors; the first capacitor of the first sub-pixel is less than the first capacitor of the second sub-pixel, and the second capacitor of the first sub-pixel is greater than the second capacitor of the second sub-pixel.

In some embodiments, the liquid crystal display panel further comprises a common electrode layer, the pixel electrode and the common electrode layer form a third capacitor, a ratio of the first capacitor of the first sub-pixel to a sum of the first capacitor, the second capacitor, and the third capacitor of the first sub-pixel, is equal to a ratio of the first capacitor of the second sub-pixel to a sum of the first capacitor, the second capacitor, and the third capacitor of the second sub-pixel.

In some embodiments, a directly opposite area of the drain electrode of the first sub-pixel and the gate electrode of the first sub-pixel, is greater than a directly opposite area of the drain electrode of the second sub-pixel and the gate electrode of the second sub-pixel.

In some embodiments, in a region of the drain electrode directly facing the gate electrode, a width of the gate electrode of the first sub-pixel is equal to a width of the gate electrode of the second sub-pixel, and a width of at least one portion of the drain electrode of the first sub-pixel is greater than a width of the drain electrode of the second sub-pixel.

In some embodiments, in the region of the drain electrode directly facing the gate electrode, the drain electrode of the first sub-pixel comprises a first portion and a second portion, and a width of the first portion is greater than a width of the second portion.

In some embodiments, in the region of the drain electrode directly facing the gate electrode, and a width of each portion of the drain electrode of the first sub-pixel is consistent.

In some embodiments, an interval of the drain electrode of the first sub-pixel and the gate electrode of the first sub-pixel, is less than an interval of the drain electrode of the second sub-pixel and the gate electrode of the second sub-pixel.

In some embodiments, the liquid crystal display panel further comprises a color resist layer, the color resist layer is disposed between the first metal layer and the pixel electrode layer, the color resist layer comprises a first color resist corresponding to the first sub-pixel and a second color resist corresponding to the second sub-pixel, and a thickness of the first color resist is greater than a thickness of the second color resist.

In some embodiments, the color resist layer further comprises a third color resist, and a thickness of the third color resist is equal to a thickness of the second color resist.

In some embodiments, the first color resist comprises a blue color resist, and the second color resist comprises one of a red color resist and a green color resist.

Also, the embodiment of the present application provides a liquid crystal display device, the liquid crystal display device comprises a liquid crystal display panel and a backlight module, the liquid crystal display panel is disposed in a light exiting direction of the backlight module, and the liquid crystal display panel comprises:

a base substrate;

a first metal layer disposed on a side of the base substrate, wherein the first metal layer comprises a gate electrode;

a second metal layer disposed on a side of the first metal layer, wherein the second metal layer comprises a drain electrode; and a pixel electrode layer disposed on a side of the second metal layer away from the base substrate, wherein the pixel electrode layer comprises a pixel electrode, and the pixel electrode is electrically connected to the drain electrode;

wherein the pixel electrode and the gate electrode form a first capacitor, the drain electrode and the gate electrode form a second capacitor, the liquid crystal display panel comprises a plurality of pixel units disposed in an array, each of the pixel units comprises a first sub-pixel and a second sub-pixel displaying different colors; the first capacitor of the first sub-pixel is less than the first capacitor of the second sub-pixel, and the second capacitor of the first sub-pixel is greater than the second capacitor of the second sub-pixel.

In some embodiments, the liquid crystal display panel further comprises a common electrode layer, the pixel electrode and the common electrode layer form a third capacitor, a ratio of the first capacitor of the first sub-pixel to a sum of the first capacitor, the second capacitor, and the third capacitor of the first sub-pixel, is equal to a ratio of the first capacitor of the second sub-pixel to a sum of the first capacitor, the second capacitor, and the third capacitor of the second sub-pixel.

In some embodiments, a directly opposite area of the drain electrode of the first sub-pixel and the gate electrode of the first sub-pixel, is greater than a directly opposite area of the drain electrode of the second sub-pixel and the gate electrode of the second sub-pixel.

In some embodiments, in a region of the drain electrode directly facing the gate electrode, a width of the gate electrode of the first sub-pixel is equal to a width of the gate electrode of the second sub-pixel, and a width of at least one portion of the drain electrode of the first sub-pixel is greater than a width of the drain electrode of the second sub-pixel.

In some embodiments, in the region of the drain electrode directly facing the gate electrode, the drain electrode of the first sub-pixel comprises a first portion and a second portion, and a width of the first portion is greater than a width of the second portion.

In some embodiments, in the region of the drain electrode directly facing the gate electrode, and a width of each portion of the drain electrode of the first sub-pixel is consistent.

In some embodiments, an interval of the drain electrode of the first sub-pixel and the gate electrode of the first sub-pixel, is less than an interval of the drain electrode of the second sub-pixel and the gate electrode of the second sub-pixel.

In some embodiments, the liquid crystal display panel further comprises a color resist layer, the color resist layer is disposed between the first metal layer and the pixel electrode layer, the color resist layer comprises a first color resist corresponding to the first sub-pixel and a second color resist corresponding to the second sub-pixel, and a thickness of the first color resist is greater than a thickness of the second color resist.

In some embodiments, the color resist layer further comprises a third color resist, and a thickness of the third color resist is equal to a thickness of the second color resist.

In some embodiments, the first color resist comprises a blue color resist, and the second color resist comprises one of a red color resist and a green color resist.

Advantages

The present application provides a liquid crystal display panel and a liquid crystal display device. The liquid crystal display panel comprises a base substrate, a first metal layer, a second metal layer, and a pixel electrode layer. The first metal layer is disposed on a side of the base substrate. The first metal layer comprises a gate electrode, the second metal layer is disposed on a side of the first metal layer. The second metal layer comprises a drain electrode. The pixel electrode layer is disposed on a side of the second metal layer away from the base substrate. The pixel electrode layer comprises a pixel electrode, and the pixel electrode is connected to the drain electrode. The pixel electrode and the gate electrode form a first capacitor. The drain electrode and the gate electrode form a second capacitor. The liquid crystal display panel comprises a plurality of pixel units disposed in an array, each of the pixel units comprises a first sub-pixel and a second sub-pixel displaying different colors. The first capacitor of the first sub-pixel is less than the first capacitor of the second sub-pixel. The second capacitor of the first sub-pixel is greater than the second capacitor of the second sub-pixel. The present application, by making the second capacitor of the first sub-pixel greater than the second capacitor of the second sub-pixel and connects the drain electrode to the pixel electrode, increases a ratio of a second capacitor in a capacitor formed by and connected to the pixel electrode in the first sub-pixel and decreases a ratio of the first capacitor of the first sub-pixel in a capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel similar or even the same, thus to avoid issues of the display crosstalk and afterimage.

DESCRIPTION OF DRAWINGS

Specific embodiments of the present invention are described in details with accompanying drawings as follows to make technical solutions and advantages of the present invention clear.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

Figure 1:
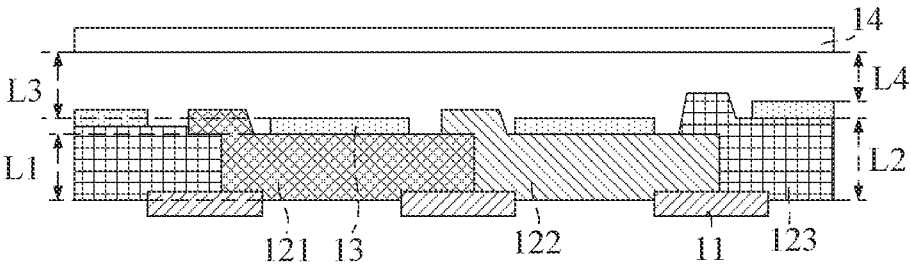
FIG. 1 is a schematic view of a conventional liquid crystal display device.

With reference to FIG. 1, in a conventional liquid crystal display panel adopting a Trigate technology, a thickness L1 of red color resist 121 is equal to a thickness L1 of a green color resist 122, and a thickness L2 of a blue color resist 123 is greater than the thickness L1 of a red color resist 121, which leads to a lateral capacitor between two electrode plates being the a pixel electrode 13 and a gate electrode 11 in the blue pixel being different from a lateral capacitor of two electrode plates being the pixel electrode 13 and the gate electrode 11 in a red pixel and causes an interval L4 between the pixel electrode 13 and the common electrode 14 of the blue pixel being different from an interval L3 between the pixel electrode 13 and the common electrode 14 of the red pixel such that a ratio of a lateral capacitor of two electrode plates being the pixel electrode 13 and the gate electrode 11 in the red pixel in the capacitor formed by and connected to the pixel electrode is different from a ratio of a lateral capacitor of two electrode plates being the pixel electrode 13 and the gate electrode 11 in the blue pixel in the capacitor formed by and connected to the pixel electrode to further cause a difference between an optimal common voltage the blue pixel of and the optimal common voltage of the red pixel to further result in issues of the display crosstalk and afterimage. Thus, the conventional liquid crystal display panel has an issue of a different ratio of a capacitor of a pixel electrode and a gate electrode of a pixel of a different light emitting color in a total capacitor formed by or connected to the pixel electrode to further cause the display crosstalk and afterimage.

The embodiment of the present application aims at the above technical issue, provides a liquid crystal display panel and a liquid crystal display device for easing the above technical issue.

Figure 2:
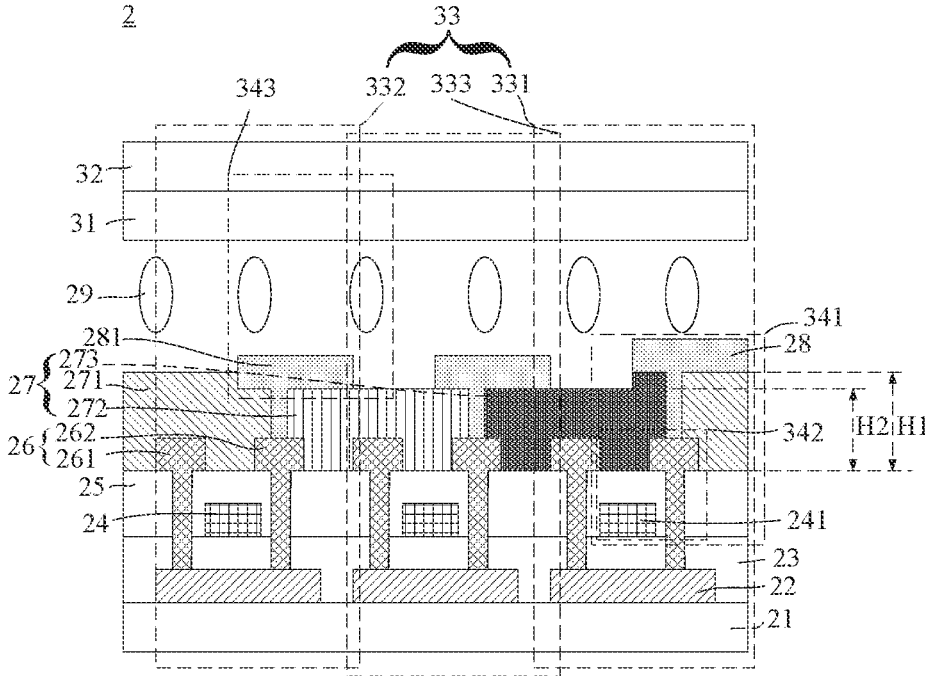
FIG. 2 is a first schematic view of a liquid crystal display panel provided by the embodiment of the present application.
Figure 3:
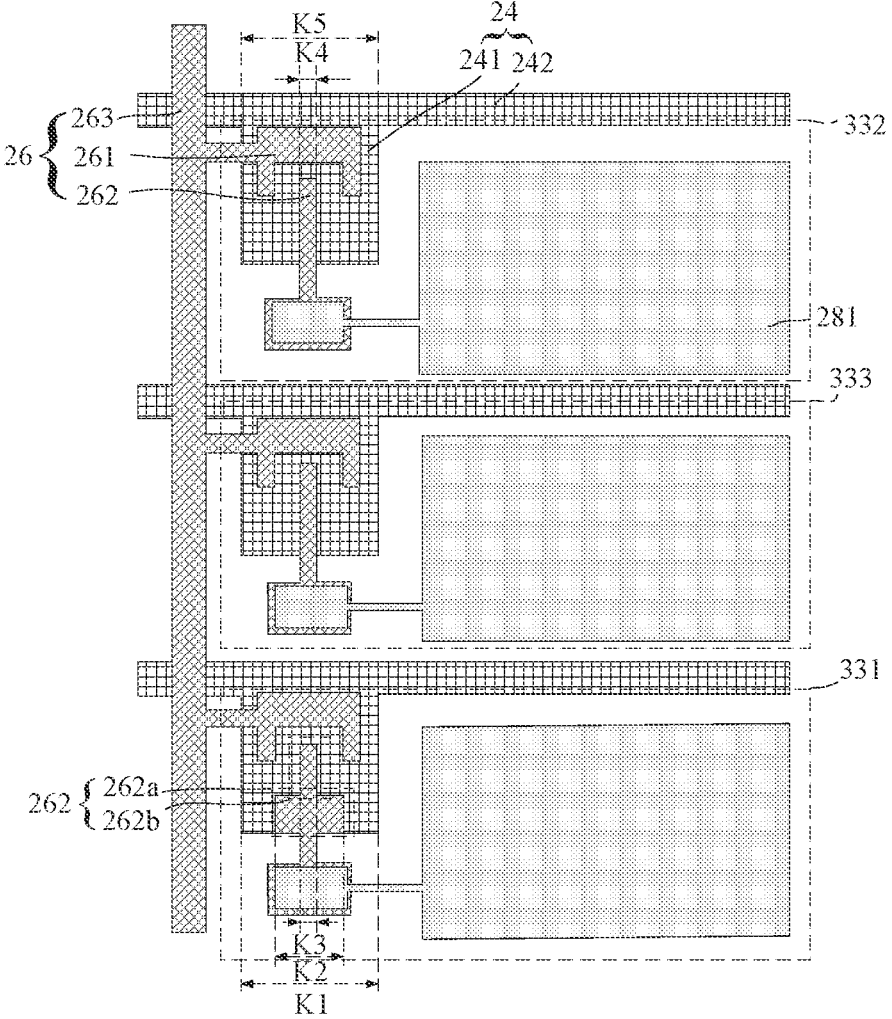
FIG. 3 is a second schematic view of the liquid crystal display panel provided by the embodiment of the present application.

With reference to FIGS. 2 and 3, the embodiment of the present application provides a liquid crystal display panel, the liquid crystal display panel 2 comprises:

a base substrate 21;

a first metal layer 24 disposed on a side of the base substrate 21, wherein the first metal layer 24 comprises a gate electrode 241;

a second metal layer 26 disposed on a side of the first metal layer 24, wherein the second metal layer 26 comprises a drain electrode 262; and a pixel electrode layer 28 disposed on a side of the second metal layer 26 away from the base substrate 21, wherein the pixel electrode layer 28 comprises a pixel electrode 281, and the pixel electrode 281 is connected to the drain electrode 262;

wherein the pixel electrode 281 and the gate electrode 241 form a first capacitor 341, the drain electrode 262 and the gate electrode 241 form a second capacitor 342, the liquid crystal display panel 2 comprises a plurality of pixel units disposed in an array 33, the pixel units 33 comprises a first sub-pixel 331 and a second sub-pixel 332 displaying different colors, the first capacitor 341 of the first sub-pixel 331 is less than the first capacitor 341 of the second sub-pixel 332, the second capacitor 342 of the first sub-pixel 331 is greater than the second capacitor 342 of the second sub-pixel 332.

The embodiment of the present application provides a liquid crystal display panel. The liquid crystal display panel, by making the second capacitor of the first sub-pixel greater than the second capacitor of the second sub-pixel and connecting the drain electrode to the pixel electrode, increases a ratio of a second capacitor in a capacitor formed by and connected to the pixel electrode in the first sub-pixel and decreases a ratio of the first capacitor of the first sub-pixel in a capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel similar or even the same, thus to avoid issues of the display crosstalk and afterimage.

It should be explained that the capacitor formed by and connected to the pixel electrode means pixel electrode serves as a capacitor of a capacitor electrode plate and a capacitor connected to a pixel electrode. For example, two electrode plates of the first capacitor are a pixel electrode and a gate electrode, and then the first capacitor is a capacitor formed by the pixel electrode. Two electrode plates of the second capacitor are a drain electrode and a gate electrode, the drain electrode is connected to the pixel electrode, and then the second capacitor is a capacitor connected to the pixel electrode. Both the first capacitor and the second capacitor influence an electrical potential of the pixel electrode to further influence optimal common voltages of different sub-pixels. Therefore, the embodiment of the present application, by changing second capacitors of different sub-pixels, can make optimal common voltages of different sub-pixels similar or even consistent to avoid issues of the display crosstalk and afterimage.

In particular, in a conventional liquid crystal display device, because a design of a thin film transistor of each sub-pixel is the same, a capacitor of two electrode plates being a gate electrode and a drain electrode in each sub-pixel is the same. However, because a thickness of a blue color resist is different from a thickness of a red color resist and a green color resist, a lateral capacitor of two electrode plates being the pixel electrode and the gate electrode in the blue sub-pixel is different from a lateral capacitor of two electrode plates being the pixel electrode and the gate electrode in the red sub-pixel and green sub-pixel. Also, the interval between the common electrode and the pixel electrode of the blue sub-pixel is different from the interval between the common electrode and the pixel electrode of each of the red sub-pixel and the green sub-pixel such that in the blue sub-pixel, the ratio of the lateral capacitor of the two electrode plates being the pixel electrode and the gate electrode in the capacitor formed by and connected to the pixel electrode is greater than a ratio of the lateral capacitor of the two electrode plates being the pixel electrode and the gate electrode in each of the red sub-pixel and the green sub-pixel in the capacitor formed by and connected to the pixel electrode, which results in that an optimal common voltage of the blue sub-pixel is greater than an optimal common voltage of each of the red sub-pixel and the green sub-pixel to cause crosstalk during display.

The embodiment of the present application, by making the second capacitor of the first sub-pixel being greater than the second capacitor of the second sub-pixel, increases a ratio of the second capacitor of the first sub-pixel in the capacitor formed by and connected to the pixel electrode, decreases the ratio of the first capacitor of the first sub-pixel in the capacitor formed by and connected to the pixel electrode to make a ratio of the first capacitor in the sub-pixel of a different light emitting color in the capacitor formed by and connected to the pixel electrode similar or even the same such that optimal common voltages of the first sub-pixel and the second sub-pixel are similar or even the same to avoid issues of the display crosstalk and afterimage.

In an embodiment, with reference to FIG. 2, the liquid crystal display panel 2 further comprises a common electrode layer 31, and the pixel electrode 281 and the common electrode layer 31 form a third capacitor. A ratio of the first capacitor 341 of the first sub-pixel 331 to a sum of the first capacitor 341, the second capacitor 342, and the third capacitor 343 of the first sub-pixel 331, is equal to a ratio of the first capacitor 341 of the second sub-pixel 332 to a sum of the first capacitor 341, the second capacitor 342, and the third capacitor 343 of the second sub-pixel 332. By making the ratio of the first capacitor 341 of the first sub-pixel 331 to the sum of the first capacitor 341, the second capacitor 342, and the third capacitor 343 of the first sub-pixel 331 equal to the ratio of the first capacitor 341 of the second sub-pixel 332 to the sum of the first capacitor 341, the second capacitor 342, and the third capacitor 343 of the second sub-pixel 332, a ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In particular, when the capacitor formed by and connected to the pixel electrode comprises a first capacitor, a second capacitor, and a third capacitor, adjusting the second capacitors of first sub-pixel and the second sub-pixel to make the second capacitor of the first sub-pixel greater than the second capacitor of the second sub-pixel can decrease a ratio of the first capacitor of the first sub-pixel in the sum of the first capacitor, the second capacitor, and the third capacitor in the first sub-pixel such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

A ratio of a capacitor of a pixel electrode and a gate electrode of a pixel of a different light emitting color in a total capacitor formed by or connected to a pixel electrode is different to further cause issues of the display crosstalk and afterimage. In an embodiment, with reference to FIG. 3, a directly opposite area of the drain electrode 262 of the first sub-pixel 331 and the gate electrode 241 of the first sub-pixel 331 is greater than a directly opposite area of the drain electrode 262 of the second sub-pixel 332 and the gate electrode 241 of the second sub-pixel 332. The directly opposite area of the drain electrode 262 of the first sub-pixel 331 and the gate electrode 241 of the first sub-pixel 331 is greater than the directly opposite area of the drain electrode 262 of the second sub-pixel 332 and the gate electrode 241 of the second sub-pixel 332 such that the second capacitor of the first sub-pixel is greater than the second capacitor of the second sub-pixel to decrease the first capacitor of the first sub-pixel in the capacitor formed by and connected to the pixel electrode. Therefore, the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In an embodiment, with reference to FIG. 3, in a region of the drain electrode 262 disposed directly opposite to the gate electrode 241, a width K1 of the gate electrode 241 of the first sub-pixel 331 is equal to a width K5 of the gate electrode 241 of the second sub-pixel 332, and a width of at least one portion of the drain electrode 262 of the first sub-pixel 331 is greater than a width K4 of the drain electrode 262 of the second sub-pixel 332 (for example, a width K2 of a first portion 262*a* of the first sub-pixel 331 is greater than a width K4 of the drain electrode 262 of the second sub-pixel 332). The width of at least one portion of the drain electrode 262 of the first sub-pixel 331 greater than the width of drain electrode 262 of the second sub-pixel 332 increases an area of the drain electrode of the first sub-pixel such that a directly opposite area of the drain electrode of the first sub-pixel and the gate electrode of the first sub-pixel is increased, the second capacitor in the first sub-pixel is increased to decrease the first capacitor of the first sub-pixel in the capacitor formed by and connected to the pixel electrode. Therefore, the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In particular, during disposing the gate electrode, an area of the gate electrode of a different sub-pixel can keep the same, in particular, a length and a width of a gate electrode of a different sub-pixel can be constant, an area of the gate electrode of each sub-pixel is equal to prevent changing the first capacitor and can prevent increasing processes. Also, changing the width of the drain electrode of the sub-pixel can change an area of the drain electrode of the sub-pixel to make the directly opposite area of the drain electrode of the first sub-pixel and the gate electrode of the first sub-pixel greater than a directly opposite area of the drain electrode and the gate electrode of the second sub-pixel to increase the second capacitor in the first sub-pixel to decrease the first capacitor of the first sub-pixel in the capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In an embodiment, with reference to FIG. 3, in a region of the drain electrode 262 disposed directly opposite to the gate electrode 241 $n$, the drain electrode 262 of the first sub-pixel 331 comprises a first portion 262*a* and a second portion 262*b*. A width K2 of the first portion 262*a* is greater than a width K3 of the second portion 262*b*. In the region of the drain electrode 262 disposed directly opposite to the gate electrode 241, the drain electrode of the first sub-pixel 331 comprising a first portion 262*a* and a second portion 262*b* with the width K2 of the first portion 262*a* being greater than the width K3 of the second portion 262*b* can increase an area of the drain electrode of the first sub-pixel to increase the directly opposite area of the drain electrode and the gate electrode of the first sub-pixel, increase the second capacitor in the first sub-pixel to decrease a ratio of the first capacitor in the first sub-pixel in a capacitor formed by or connected to a pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In particular, the width K3 of the second portion 262*b* of the first sub-pixel 331 can be equal to the width K4 of the drain electrode 262 of the second sub-pixel 332 such that when an area of the gate electrode of the first sub-pixel 331 is kept the same as an area of the gate electrode of the second sub-pixel 332 and the width K3 of the second portion 262*b* of the first sub-pixel 331 is kept the same as the width K4 of the drain electrode 262 of the second sub-pixel 332, the second capacitor of the first sub-pixel is adjusted by adjusting the width of the first portion 262*a* of the first sub-pixel 331. Thus, the first capacitor of the first sub-pixel in the capacitor formed by and connected to the pixel electrode can be further adjusted such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

Figure 4:
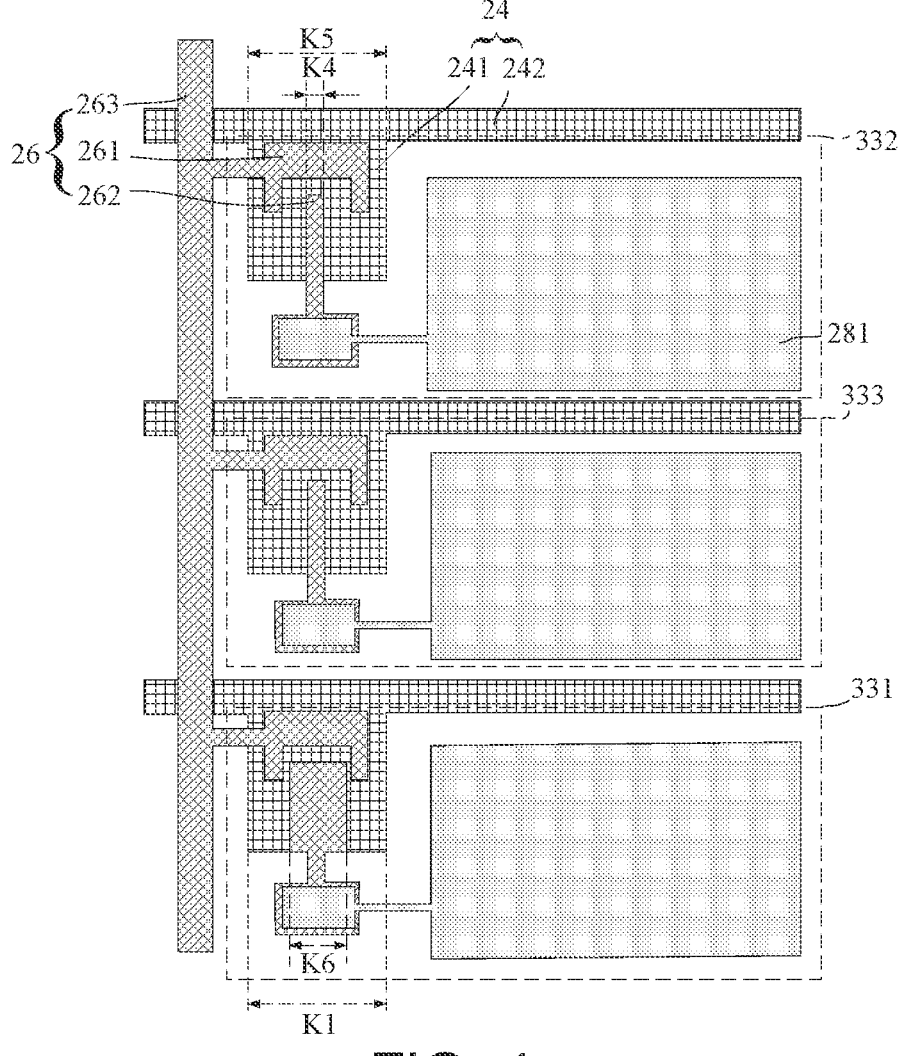
FIG. 4 is a third schematic view of the liquid crystal display panel provided by the embodiment of the present application.

In an embodiment, with reference to FIG. 4, in a region of the drain electrode 262 disposed directly opposite to the gate electrode 241, a width of each portion of the drain electrode 262 of the first sub-pixel 331 is consistent (for example, the width of each portion is K6). In a region of the drain electrode directly opposite to the gate electrode, the width of each portion of the drain electrode of the first sub-pixel to make the width of the drain electrode of the first sub-pixel greater than the width of the drain electrode of the second sub-pixel such that the directly opposite area of the drain electrode and the gate electrode of the first sub-pixel is greater than the directly opposite area of the drain electrode and the gate electrode of the second sub-pixel. Therefore, the second capacitor of the first sub-pixel can be greater than the second capacitor of the second sub-pixel to accordingly decrease the first capacitor of the first sub-pixel in the capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In particular, during disposing the drain electrode of the first sub-pixel, a width of a portion of the drain electrode of the first sub-pixel can be increased to decrease a resistance of the drain electrode, however, the embodiment of the present application is not limited thereto. For example, both widths of the drain electrodes of the first sub-pixel and the second sub-pixel can be decreased, but in a region of the drain electrode directly facing the gate electrode, a width of at least one portion of the drain electrode of the first sub-pixel is still greater than a width of the drain electrode of the second sub-pixel.

Figure 5:
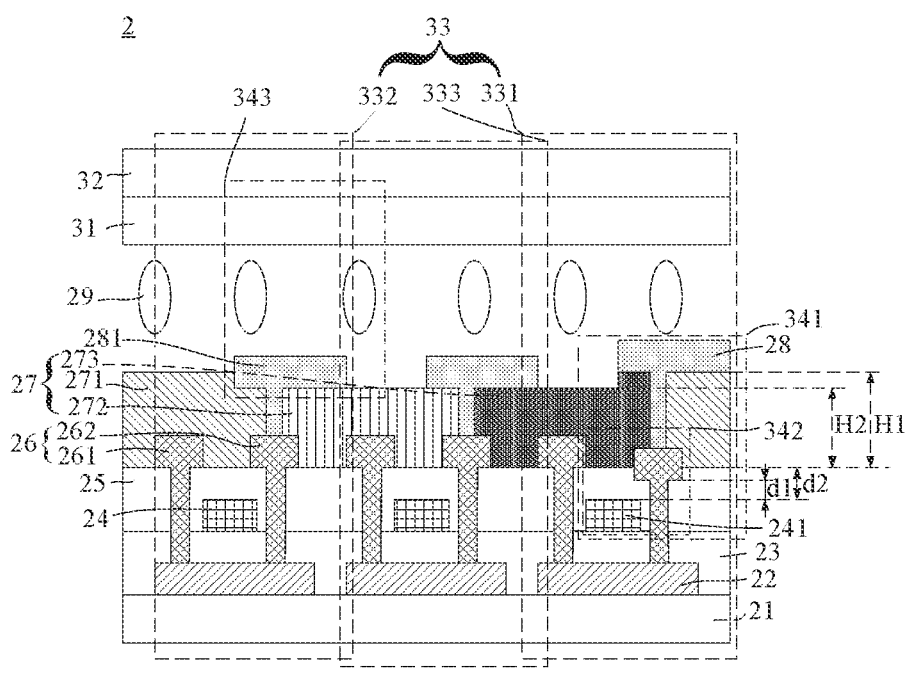
FIG. 5 is a fourth schematic view of the liquid crystal display panel provided by the embodiment of the present application.

In an embodiment, with reference to FIG. 5, an interval d1 between the drain electrode 262 of the first sub-pixel 331 and the gate electrode 241 of the first sub-pixel 331 is less than an interval d2 between the drain electrode 262 of the second sub-pixel 332 and the gate electrode 241 of the second sub-pixel 332. The interval between the drain electrode of the first sub-pixel and the gate electrode of the first sub-pixel less than the interval between the drain electrode of the second sub-pixel and the gate electrode of the second sub-pixel makes the second capacitor of the first sub-pixel greater than the second capacitor of the second sub-pixel and accordingly decreases the first capacitor of the first sub-pixel in the capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In particular, when the interval between the drain electrode of the first sub-pixel and the gate electrode of the first sub-pixel is less than the interval between the drain electrode of the second sub-pixel and the gate electrode of the second sub-pixel, upper surfaces of the gate electrodes of the first sub-pixel and the second sub-pixel can be in different planes. Also with reference to FIG. 5, upper surfaces of the drain electrodes in the first sub-pixel and the second sub-pixel can be also in different planes, and upper surfaces of the gate electrodes in the first sub-pixels and second sub-pixels can also be in different planes, the upper surfaces of the drain electrodes in the first sub-pixel and the second sub-pixel can be in different planes such that lower surfaces of the color resist layer are in different planes by filling an insulation layer.

In particular, the above embodiment take an example, that the directly opposite area of the drain electrode of the first sub-pixel and the gate electrode of the first sub-pixel is greater than the directly opposite area of the drain electrode of the second sub-pixel and the gate electrode of the second sub-pixel, and the interval between the drain electrode of the first sub-pixel and the gate electrode of the first sub-pixel is less than the interval between the drain electrode of the second sub-pixel and the gate electrode of the second sub-pixel, for detailed explanation. However, the embodiment of the present application is not limited thereto. For example, the directly opposite area of the drain electrode of the first sub-pixel and the gate electrode of the first sub-pixel is greater than the directly opposite area of the drain electrode of the second sub-pixel and the gate electrode of the second sub-pixel, and the interval between the drain electrode of the first sub-pixel and the gate electrode of the first sub-pixel is less than the interval between the drain electrode of the second sub-pixel and the gate electrode of the second sub-pixel, simultaneously. Also, the directly opposite area of the drain electrode of the first sub-pixel and the gate electrode of the first sub-pixel can be greater than the directly opposite area of the drain electrode of the second sub-pixel and the gate electrode of the second sub-pixel, and the interval between the drain electrode of the first sub-pixel and the gate electrode of the first sub-pixel can be greater than or equal to the interval between the drain electrode of the second sub-pixel and the gate electrode of the second sub-pixel. Also, the directly opposite area of the drain electrode of the first sub-pixel and the gate electrode of the first sub-pixel can be less than or equal to the directly opposite area of the drain electrode of the second sub-pixel and the gate electrode of the second sub-pixel, and the interval between the drain electrode of the first sub-pixel and the gate electrode of the first sub-pixel can be less than the interval between the drain electrode of the second sub-pixel and the gate electrode of the second sub-pixel. Regardless of the method of configuration, the second capacitor of the first sub-pixel is always greater than the second capacitor of the second sub-pixel.

A different reversal point of a transmittance of a different sub-pixel would lead to an issue of color deviation during display. In an embodiment, with reference to FIG. 2, the liquid crystal display panel 2 further comprises a color resist layer 27, and the color resist layer 27 is disposed between the first metal layer 24 and the pixel electrode layer 28. The color resist layer 27 comprises a first color resist 271 corresponding to the first sub-pixel 331 and a second color resist 272 corresponding to the second sub-pixel 332. A thickness H1 of the first color resist 271 is greater than a thickness H2 of the second color resist 272. The thickness of the first color resist is greater than the thickness of the second color resist such that the first capacitor in the first sub-pixel is less than the first capacitor of the second sub-pixel, which can mitigate the color deviation resulting from a different reversal point of a transmittance of a different sub-pixel. Also, the second capacitor of the first sub-pixel greater than the second capacitor of the second sub-pixel decreases the ratio of the first capacitor of the first sub-pixel in the capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode, which simultaneously resolve the issues of the color deviation, crosstalk, and afterimage of the display panel.

In particular, with reference to FIG. 2, it can be seen that the thickness of the first color resist 271 in the first sub-pixel 331 is greater than the thickness of the second color resist 272 in the second sub-pixel 332 to make the first capacitor 341 in the first sub-pixel 331 less than the first capacitor 341 in the second sub-pixel 332, and make the third capacitor 343 in the first sub-pixel 331 less than the third capacitor 343 in the second sub-pixel 332, which can prevent the first sub-pixel from reaching a reversal point of a transmittance faster to avoid color deviation of display. Also, the embodiment of the present application makes the second capacitor 342 of the first sub-pixel 331 greater than the second capacitor 342 of the second sub-pixel 332 such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel consistent to avoid issues of the display crosstalk and the afterimage.

In an embodiment, with reference to FIG. 2, the color resist layer 27 further comprises a third color resist 273, and a thickness of the third color resist 273 is equal to a thickness of the second color resist 272 (for example, with reference to FIG.

2, both thicknesses of the second color resist 272 and the third color resist 273 are H2). The thickness of the third color resist 273 equal to second color resist 272 thickness makes the first capacitor and the third capacitor of the third sub-pixel 333 equal to the first capacitor and the third capacitor of the second sub-pixel 332 respectively, and also makes the second capacitor of the third sub-pixel equal to the second capacitor of the third sub-pixel to prevent unequal capacitors in the second sub-pixel and the third sub-pixel to result in different optimal common voltages of the second sub-pixel and the third sub-pixel, which avoids the display crosstalk and afterimage of the display panel.

In particular, reversal points of the transmittances of second sub-pixel and the third sub-pixel are close such that the thickness of the second color resist of the second sub-pixel can be consistent with the thickness of the third color resist of the third sub-pixel to make the first capacitor of the second sub-pixel equal to the first capacitor of the third sub-pixel, the second capacitor of the second sub-pixel equal to the second capacitor of the third sub-pixel, and the third capacitor of the second sub-pixel equal to the third capacitor of the third sub-pixel, which can make optimal common voltages of the second sub-pixel and the third sub-pixel consistent. Furthermore, it can be known from the above embodiment that the optimal common voltage of the first sub-pixel is similar to or even consistent with the optimal common voltage of the second sub-pixel such that the optimal common voltage of each sub-pixel in the liquid crystal display panel is similar or even the same, which prevents the display crosstalk and afterimage of the display panel.

In an embodiment, the first color resist comprises a blue color resist, and the second color resist comprises one of a red color resist and a green color resist. The first color resist comprises the blue color resist and the second color resist comprises one of a red color resist and a green color resist such that when the optimal common voltage of the blue sub-pixel is inconsistent with the optimal common voltage of each of the red sub-pixel and the green sub-pixel, adjusting the second capacitor of the blue sub-pixel make the optimal common voltage of the blue sub-pixel similar to or even consistent with the optimal common voltage of each of the red sub-pixel and the green sub-pixel so the optimal common voltage of each sub-pixel in the liquid crystal display panel is similar or even the same, which avoids display crosstalk and afterimage of the display panel.

In particular, the first sub-pixel is a blue sub-pixel, and a light emitting color of the first sub-pixel is blue. The second sub-pixel is a red sub-pixel, and a light emitting color of the second sub-pixel is red. The third sub-pixel is a green sub-pixel, and a light emitting color of the third sub-pixel is green. Alternatively, the first sub-pixel is a blue sub-pixel, and a light emitting color of the first sub-pixel is blue. The second sub-pixel is a green sub-pixel, and a light emitting color of the second sub-pixel is green. The third sub-pixel is a red sub-pixel, and a light emitting color of the third sub-pixel is red.

In particular, the above embodiment takes an example of the color resist layer disposed on the first metal layer and the pixel electrode layer for detailed explanation, but the embodiment of the present application is not limited thereto. For example, the color resist layer can be disposed on a side of the common electrode layer away from the pixel electrode layer. The first capacitor and the third capacitor is adjusted by insulation layers disposed between the first metal layer, the second metal layer, and the pixel electrode layer.

In particular, FIG. 2 takes a thin film transistor of a top gate structure as an example for explanation, however the embodiment of the present application is not limited thereto, for example, the liquid crystal display panel can comprises a thin film transistor of a bottom gate structure.

In an embodiment, with reference to FIG. 2, the liquid crystal display panel 2 further comprises an active layer 22, a gate electrode insulation layer 23, and an interlayer insulation layer 25. The active layer 22 is disposed between the gate electrode insulation layer 23 and the base substrate 21, and the interlayer insulation layer 25 is disposed between the first metal layer 24 and the second metal layer 26.

In an embodiment, with reference to FIG. 2, liquid crystal display panel 2 further comprises a liquid crystal layer 29, and the liquid crystal layer 29 is disposed between the common electrode layer 31 and the pixel electrode layer 28.

In an embodiment, with reference to FIG. 2, liquid crystal display panel 2 further comprises a substrate 32, and the substrate 32 is disposed on a side of the common electrode layer 31 away from the pixel electrode layer 28.

In an embodiment, with reference to FIG. 3, the first metal layer 24 further comprises scan lines 242, and each sub-pixel is disposed to correspond to one scan line 242. For example, the first sub-pixel 331 is disposed to correspond to one scan line 242, and the second sub-pixel 332 is disposed to correspond to another scan line 242.

In an embodiment, with reference to FIG. 3, the second metal layer 26 further comprises a source electrode 261 data lines 263.

Figure 6:
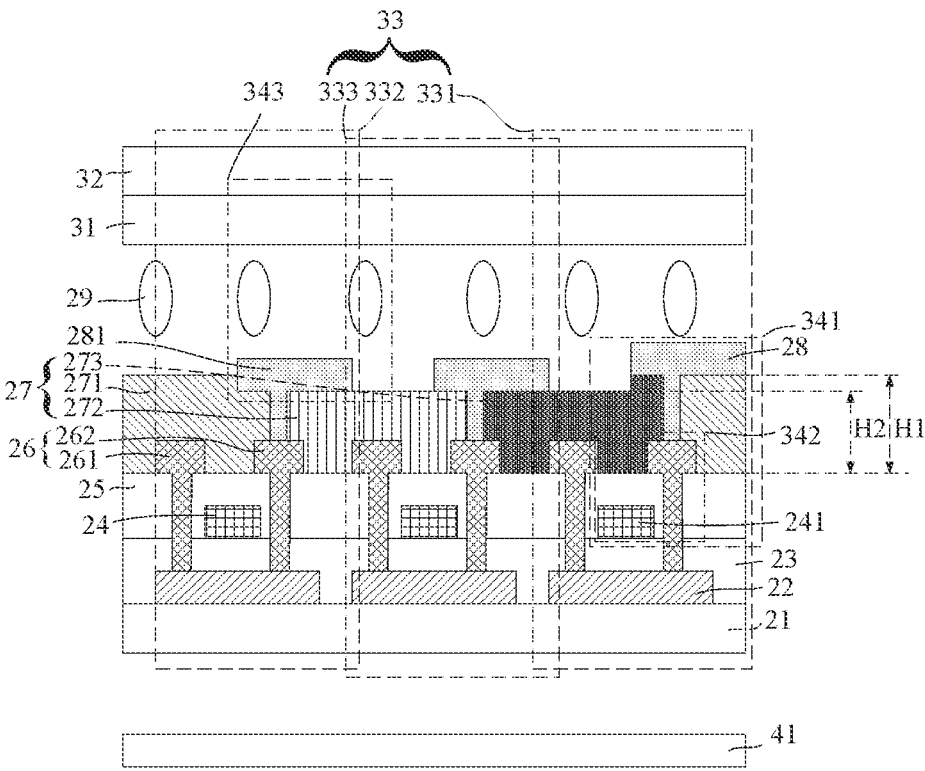
FIG. 6 is a schematic view of a liquid crystal display device provided by the embodiment of the present application.

Also, the embodiment of the present application provides a liquid crystal display device, with reference to FIG. 6, the liquid crystal display device comprises any one of the liquid crystal display panel and the backlight module 41 of the above embodiments, and the liquid crystal display panel is disposed in a light exiting direction of the backlight module 41.

It can be known according to the above embodiment that:

The embodiment of the present application provides a liquid crystal display panel and a liquid crystal display device. The liquid crystal display panel comprises a base substrate, a first metal layer, a second metal layer, and a pixel electrode layer. The first metal layer is disposed on a side of the base substrate. The first metal layer comprises a gate electrode, the second metal layer is disposed on a side of the first metal layer. The second metal layer comprises a drain electrode. The pixel electrode layer is disposed on a side of the second metal layer away from the base substrate. The pixel electrode layer comprises a pixel electrode, and the pixel electrode is connected to the drain electrode. The pixel electrode and the gate electrode form a first capacitor. The drain electrode and the gate electrode form a second capacitor. The liquid crystal display panel comprises a plurality of pixel units disposed in an array, each of the pixel units comprises a first sub-pixel and a second sub-pixel displaying different colors. The first capacitor of the first sub-pixel is less than the first capacitor of the second sub-pixel. The second capacitor of the first sub-pixel is greater than the second capacitor of the second sub-pixel. The present application makes the second capacitor of the first sub-pixel greater than the second capacitor of the second sub-pixel and connects the drain electrode to the pixel electrode, which increases a ratio of a second capacitor in a capacitor formed by and connected to the pixel electrode in the first sub-pixel and decreases a ratio of the first capacitor of the first sub-pixel in a capacitor formed by and connected to the pixel electrode such that the ratio of the first capacitor of the first sub-pixel in the capacitor formed by and connected to the pixel electrode is similar to or even the same as the ratio of the first capacitor of the second sub-pixel in the capacitor formed by and connected to the pixel electrode to make optimal common voltages of the first sub-pixel and the second sub-pixel similar or even the same, thus to avoid issues of the display crosstalk and afterimage.

In the above-mentioned embodiments, the descriptions of the various embodiments are focused. For the details of the embodiments not described, reference may be made to the related descriptions of the other embodiments.

The liquid crystal display panel and the liquid crystal display device provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

What is claimed is:

1. A liquid crystal display panel, comprising:
   a base substrate;
   a first metal layer disposed on a side of the base substrate, wherein the first metal layer comprises a gate electrode;
   a second metal layer disposed on a side of the first metal layer, wherein the second metal layer comprises a drain electrode; and
   a pixel electrode layer disposed on a side of the second metal layer away from the base substrate, wherein the pixel electrode layer comprises a pixel electrode, and the pixel electrode is electrically connected to the drain electrode;
   wherein the pixel electrode and the gate electrode form a first capacitor; the drain electrode and the gate electrode form a second capacitor; the liquid crystal display panel comprises a plurality of pixel units disposed in an array, each of the pixel units comprises a first sub-pixel and a second sub-pixel displaying different colors; the first capacitor of the first sub-pixel is less than the first capacitor of the second sub-pixel, and the second capacitor of the first sub-pixel is greater than the second capacitor of the second sub-pixel.

2. The liquid crystal display panel according to claim 1, further comprising a common electrode layer, wherein the pixel electrode and the common electrode layer form a third capacitor; a ratio of the first capacitor of the first sub-pixel to a sum of the first capacitor, the second capacitor, and the third capacitor of the first sub-pixel, is equal to a ratio of the first capacitor of the second sub-pixel to a sum of the first capacitor, the second capacitor, and the third capacitor of the second sub-pixel.

3. The liquid crystal display panel according to claim 1, wherein a directly opposite area of the drain electrode of the first sub-pixel and the gate electrode of the first sub-pixel, is greater than a directly opposite area of the drain electrode of the second sub-pixel and the gate electrode of the second sub-pixel.

4. The liquid crystal display panel according to claim 3, wherein in a region of the drain electrode directly facing the gate electrode, a width of the gate electrode of the first sub-pixel is equal to a width of the gate electrode of the second sub-pixel, and a width of at least one portion of the drain electrode of the first sub-pixel is greater than a width of the drain electrode of the second sub-pixel.

5. The liquid crystal display panel according to claim 4, wherein in the region of the drain electrode directly facing the gate electrode, the drain electrode of the first sub-pixel comprises a first portion and a second portion, and a width of the first portion is greater than a width of the second portion.

6. The liquid crystal display panel according to claim 4, wherein in the region of the drain electrode directly facing the gate electrode, and a width of each portion of the drain electrode of the first sub-pixel is consistent.

7. The liquid crystal display panel according to claim 1, wherein an interval of the drain electrode of the first sub-pixel and the gate electrode of the first sub-pixel, is less than an interval of the drain electrode of the second sub-pixel and the gate electrode of the second sub-pixel.

8. The liquid crystal display panel according to claim 1, wherein the liquid crystal display panel further comprises a color resist layer, the color resist layer is disposed between the first metal layer and the pixel electrode layer, the color resist layer comprises a first color resist corresponding to the first sub-pixel and a second color resist corresponding to the second sub-pixel, and a thickness of the first color resist is greater than a thickness of the second color resist.

9. The liquid crystal display panel according to claim 8, wherein the color resist layer further comprises a third color resist, and a thickness of the third color resist is equal to a thickness of the second color resist.

10. The liquid crystal display panel according to claim 8, wherein the first color resist comprises a blue color resist, and the second color resist comprises one of a red color resist and a green color resist.

11. A liquid crystal display device, comprising a liquid crystal display panel and a backlight module, wherein the liquid crystal display panel is disposed in a light exiting direction of the backlight module, and the liquid crystal display panel comprises:

a base substrate;

a first metal layer disposed on a side of the base substrate, wherein the first metal layer comprises a gate electrode;

a second metal layer disposed on a side of the first metal layer, wherein the second metal layer comprises a drain electrode; and a pixel electrode layer disposed on a side of the second metal layer away from the base substrate, wherein the pixel electrode layer comprises a pixel electrode, and the pixel electrode is electrically connected to the drain electrode;

wherein the pixel electrode and the gate electrode form a first capacitor, the drain electrode and the gate electrode form a second capacitor, the liquid crystal display panel comprises a plurality of pixel units disposed in an array, each of the pixel units comprises a first sub-pixel and a second sub-pixel displaying different colors; the first capacitor of the first sub-pixel is less than the first capacitor of the second sub-pixel, and the second capacitor of the first sub-pixel is greater than the second capacitor of the second sub-pixel.

12. The liquid crystal display device according to claim 11, wherein the liquid crystal display panel further comprises a common electrode layer, the pixel electrode and the common electrode layer form a third capacitor, a ratio of the first capacitor of the first sub-pixel to a sum of the first capacitor, the second capacitor, and the third capacitor of the first sub-pixel, is equal to a ratio of the first capacitor of the second sub-pixel to a sum of the first capacitor, the second capacitor, and the third capacitor of the second sub-pixel.

13. The liquid crystal display device according to claim 11, wherein a directly opposite area of the drain electrode of the first sub-pixel and the gate electrode of the first sub-pixel, is greater than a directly opposite area of the drain electrode of the second sub-pixel and the gate electrode of the second sub-pixel.

14. The liquid crystal display device according to claim 13, wherein in a region of the drain electrode directly facing the gate electrode, a width of the gate electrode of the first sub-pixel is equal to a width of the gate electrode of the second sub-pixel, and a width of at least one portion of the drain electrode of the first sub-pixel is greater than a width of the drain electrode of the second sub-pixel.

15. The liquid crystal display device according to claim 14, wherein in the region of the drain electrode directly facing the gate electrode, the drain electrode of the first sub-pixel comprises a first portion and a second portion, and a width of the first portion is greater than a width of the second portion.

16. The liquid crystal display device according to claim 14, wherein in the region of the drain electrode directly facing the gate electrode, and a width of each portion of the drain electrode of the first sub-pixel is consistent.

17. The liquid crystal display device according to claim 11, wherein an interval of the drain electrode of the first sub-pixel and the gate electrode of the first sub-pixel, is less than an interval of the drain electrode of the second sub-pixel and the gate electrode of the second sub-pixel.

18. The liquid crystal display device according to claim 11, wherein the liquid crystal display panel further comprises a color resist layer, the color resist layer is disposed between the first metal layer and the pixel electrode layer, the color resist layer comprises a first color resist corresponding to the first sub-pixel and a second color resist corresponding to the second sub-pixel, and a thickness of the first color resist is greater than a thickness of the second color resist.

19. The liquid crystal display device according to claim 18, wherein the color resist layer further comprises a third color resist, and a thickness of the third color resist is equal to a thickness of the second color resist.

20. The liquid crystal display device according to claim 18, wherein the first color resist comprises a blue color resist, and the second color resist comprises one of a red color resist and a green color resist.

* * * * *